United States Patent
Larsson

(10) Patent No.: US 9,347,750 B2
(45) Date of Patent: May 24, 2016

(54) DETERMINATION OF ANGLE OF INCIDENCE

(75) Inventor: Mats Larsson, Karlskoga (SE)

(73) Assignee: BAE Systems Bofors AB, Karlskoga (SE)

( * ) Notice: Subject to any disclaimer, the term of this patent is extended or adjusted under 35 U.S.C. 154(b) by 0 days.

(21) Appl. No.: 14/345,752

(22) PCT Filed: Sep. 13, 2012

(86) PCT No.: PCT/SE2012/000134
§ 371 (c)(1),
(2), (4) Date: May 21, 2014

(87) PCT Pub. No.: WO2013/043096
PCT Pub. Date: Mar. 28, 2013

(65) Prior Publication Data
US 2014/0326824 A1    Nov. 6, 2014

(30) Foreign Application Priority Data
Sep. 20, 2011    (SE) ..................... 1130088

(51) Int. Cl.
*F42B 10/62*    (2006.01)
*F42B 10/64*    (2006.01)
(Continued)

(52) U.S. Cl.
CPC ............ *F42B 10/62* (2013.01); *F42B 10/60* (2013.01); *F42B 10/64* (2013.01); *F42B 15/01* (2013.01); *G01P 13/025* (2013.01)

(58) Field of Classification Search
CPC ....... G01P 13/02; G01P 13/025; F42B 10/60; F42B 10/62; F42B 10/64; F42B 15/01
USPC ..................................................... 244/3.1–3.3
See application file for complete search history.

(56) References Cited

U.S. PATENT DOCUMENTS 3,082,622 A    3/1963    Andrew
3,946,968 A *  3/1976    Stallard ................ 244/3.21
(Continued)

FOREIGN PATENT DOCUMENTS

| JP | 2006207945 A | 8/2006 |
| JP | 2008261529 A | 10/2008 |
| RU | 2272984 C1 | 3/2006 |

OTHER PUBLICATIONS

International Search Report and Written Opinion issued in corresponding Application No. PCT/SE2012/000134 dated Dec. 12, 2012.
(Continued)

*Primary Examiner* — Bernarr Gregory
(74) *Attorney, Agent, or Firm* — Polsinelli PC

(57) ABSTRACT

The invention relates to a method for determining angle of incidence for a projectile in the path of the projectile from launcher to target, which projectile is guidable and substantially or partially roll-stable and comprises a control system and at least two actuators with associated control members, in which the following steps are included: determination of applied force for pitch control by evaluation of the moment upon the actuators of the projectile, determination of applied force for yaw control by evaluation of the moment upon the actuators of the projectile, calculation of the pitch component α of the angle of incidence and of the yaw component β of the angle of incidence, based on comparison between the evaluated moments and reference data for moments. The invention also relates to a GNC system.

20 Claims, 1 Drawing Sheet

Figure 1:
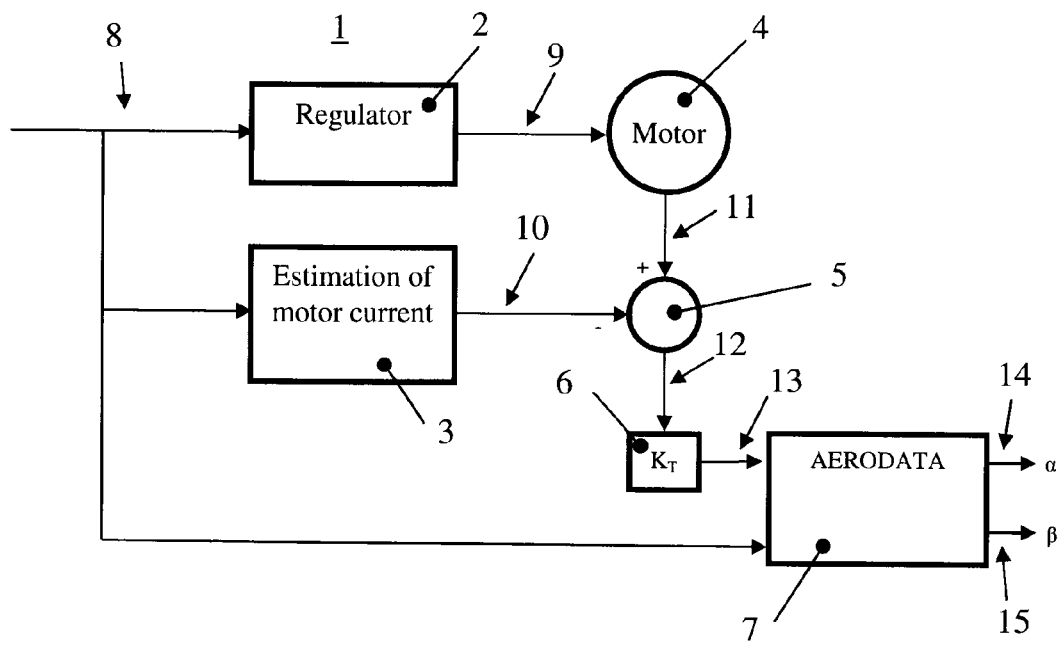

(51) Int. Cl.
*F42B 10/60* (2006.01)
*F42B 15/01* (2006.01)
*G01P 13/02* (2006.01)
*F42B 10/00* (2006.01)

(56) References Cited

U.S. PATENT DOCUMENTS

| | | |
|---|---|---|
| 4,230,290 A | 10/1980 | Townsend et al. |
| 5,115,237 A | 5/1992 | Greene |
| 5,590,853 A | 1/1997 | Greene |
| 5,593,109 A | 1/1997 | Williams |
| 2010/0185345 A1 | 7/2010 | Chiesa |

OTHER PUBLICATIONS

Supplementary European Search Report issued Mar. 12, 2015 in EP12832803.

* cited by examiner

US 9,347,750 B2

DETERMINATION OF ANGLE OF INCIDENCE

CROSS REFERENCE TO RELATED APPLICATIONS

This application is a National Phase filing under 35 U.S.C. §371 of PCT/SE2012/000134 filed on Sep. 13, 2012; and this application claims priority to Application No. 1130088-6 filed in Sweden on Sep. 20, 2011; the entire contents of all are hereby incorporated by reference.

TECHNICAL FIELD

The present invention relates to a method for determining angle of incidence for a projectile in the path of the projectile from launcher to target, which projectile is guidable and substantially or partially roll-stable and comprises a control system and at least two actuators with associated control members. The invention also relates to a GNC system for a guidable projectile, which projectile is substantially or partially roll-stable and comprises a control system and at least two actuators with associated control members.

BACKGROUND TO THE INVENTION

Problem Definition and Prior Art

Guidable projectiles use different forms of systems or devices for measuring and/or calculating their current position, attitude and velocity, as well as systems or devices for guiding the projectile. A collective name for these systems is GNC systems, in which GNC stands for Guidance, Navigation and Control. Knowledge of current position, with maximum possible accuracy, is important for calculating how the projectile must be guided in order to reach the target of the projectile. One part of the GNC system is a navigation system, which often consists of a GPS receiver and an INS unit. INS, which stands for Inertial Navigation System, uses an IMU unit as sensor for measuring the dynamic change to which the projectile is exposed during its travel from launcher to target. The IMU unit, in which IMU stands for Inertial Measurement Unit, measures the accelerations and angular velocities of the projectile. In most cases, the IMU unit is constructed with three gyrsoscopes and three accelerometers. The IMU unit uses dead reckoning for position determination, that is to say that the change in position is calculated on the basis of velocity, direction of travel and time. A GPS receiver receives positioning information from a number of GPS satellites and, on the basis of this information, calculates a position. By combining information from the GPS receiver and the IMU unit, the INS unit can calculate the position, velocity vector and orientation of the projectile with high accuracy. The change in attitude and angling of the projectile, termed yaw, pitch and roll, is measured with the gyroscopes belonging to the IMU unit.

A previously known method, see, for example, US 2010/0176238 A1, describes a guidance system and a stabilization system for rotating and/or roll-stable projectiles comprising canard fins and/or fins which rotate with the projectile. Stepping motors are arranged to move the canard fins and/or fins step-by-step or incrementally.

The control system proposed in the method is based on a neural network. One problem with the method according to US 2010/0176238 A1 is that no or limited information is obtained concerning the angle of incidence, which means that the navigation system does not give a complete or correct position determination.

An example of another previously known method, see U.S. Pat. No. 6,779,752 B1, relates to a guidance system without any gyroscope. The described system uses three accelerometers and a GPS receiver. One problem with the method according to U.S. Pat. No. 6,779,752 B1 is that no or limited information is obtained concerning the roll angle, which means that the navigation system does not give a complete or correct position determination.

An example of yet another previously known method, see U.S. Pat. No 5,775,636, relates to a guidable projectile comprising a GPS receiver. One problem with the method according to U.S. Pat. No. 5,775,636 is that no or limited information is obtained concerning the roll angle, the angle of incidence or the yaw angle, which means that the navigation system does not give a complete or correct position determination.

An example of still another previously known method, see U.S. Pat. No. 7,163,176 B1, relates to a two-dimensional correction system for both roll-stable and fin-stable projectiles. One problem with the method according to U.S. Pat. No. 7,163,176 B1 is that no or limited information is obtained concerning the angle of incidence, which means that the navigation system does not give a complete or correct position determination.

A problem with currently existing solutions according to the above-stated documents is thus that no or limited information is obtained concerning the angle of incidence, which means that the navigation system does not give a complete or correct position determination.

Further problems which the invention intends to solve will emerge in connection with the following detailed description of the various embodiments.

Object of the Invention and its Distinguishing Features

The present invention calculates and determines angle of incidence for a projectile on the basis of a fewer number of sensors than conventional systems.

The present invention relates to a method for determining angle of incidence for a projectile in the path of the projectile from launcher to target, which projectile is guidable and substantially or partially roll-stable and comprises a control system and at least two actuators with associated control members, in which the following steps are included:

determination of applied force for pitch control by evaluation of the moment upon the actuators of the projectile, determination of applied force for yaw control by evaluation of the moment upon the actuators of the projectile, calculation of the pitch component $\alpha$ of the angle of incidence and of the yaw component $\beta$ of the angle of incidence, based on comparison between the evaluated moments and reference data for moments.

According to further aspects of the improved method for determining angle of incidence according to the invention:

reference data for moments are obtained from a look-up table produced on the basis of measurement of aerodynamic characteristics of the projectile;

reference data for moments are obtained from a look-up table produced from calculation of aerodynamic characteristics of the projectile;

comparison of the evaluated moment and reference data for moments is made by the reference data which are closest to the evaluated moment providing an evaluation of the pitch component α of the angle of incidence and of the yaw component β of the angle of incidence, on the basis of the look-up table of the said reference data;

comparison of the evaluated moment and reference data for moments is made by the said reference data being a basis for the creation of a mathematical description of the said reference data, which mathematical description uses the said evaluated moments as variables in the mathematical description in such a way that the pitch component α of the angle of incidence and the yaw component β of the angle of incidence are calculated; the evaluated moment is determined on the basis of measurement of electric current to the drive unit of the actuators;

the evaluated moment is determined by measurement of torques acting on the actuators with a torque transmitter.

The invention additionally relates to a GNC system for a guidable projectile, which projectile is guidable and substantially or partially roll-stable and comprises a control system and at least two actuators with associated control members, in which angle of incidence is determined by the following steps:

determination of applied force for pitch control by evaluation of the moment upon the actuators of the projectile, determination of applied force for yaw control by evaluation of the moment upon the actuators of the projectile, calculation of the pitch component α of the angle of incidence and of the yaw component β of the angle of incidence, based on comparison between the evaluated moments and reference data for moments.

According to further aspects of the improved GNC system for a guidable projectile according to the invention:

reference data for moments are obtained from a look-up table produced on the basis of measurement of aerodynamic characteristics of the projectile;

reference data for moments are obtained from a look-up table produced from calculation of aerodynamic characteristics of the projectile;

comparison of the evaluated moment and reference data for moments is made by the reference data which are closest to the evaluated moment providing an evaluation of the pitch component α of the angle of incidence and of the yaw component β of the angle of incidence, on the basis of the look-up table of the said reference data;

comparison of the evaluated moment and reference data for moments is made by the said reference data being a basis for the creation of a mathematical description of the said reference data, which mathematical description uses the said evaluated moments as variables in the mathematical description in such a way that the pitch component α of the angle of incidence and the yaw component β of the angle of incidence are calculated;

the evaluated moment is determined on the basis of measurement of electric current to the drive unit of the actuators;

the evaluated moment is determined by measurement of torques acting on the actuators with a torque transmitter.

Advantages and Effects of the Invention

On the basis of the proposed method and the proposed GNC system, the angle of incidence of the projectile can be evaluated by comparing applied moment on control surfaces or fins with moments upon control surfaces or fins which have been measured from a wind tunnel, or moment upon control surfaces or fins which has been calculated on the basis of simulations. The angle of incidence of the projectile can be used together with measured roll angular velocity, for example from a roll gyro, to calculate the roll angle. Roll, pitch and yaw angles, together with a GPS receiver, provide sensor information for a complete GNC system, so that determination of angle of incidence results in a simpler GNC system. The simplification compared with a traditional GNC system is that only one gyro is used, instead of three gyros and three accelerometers.

LIST OF FIGURES

Figure 2:
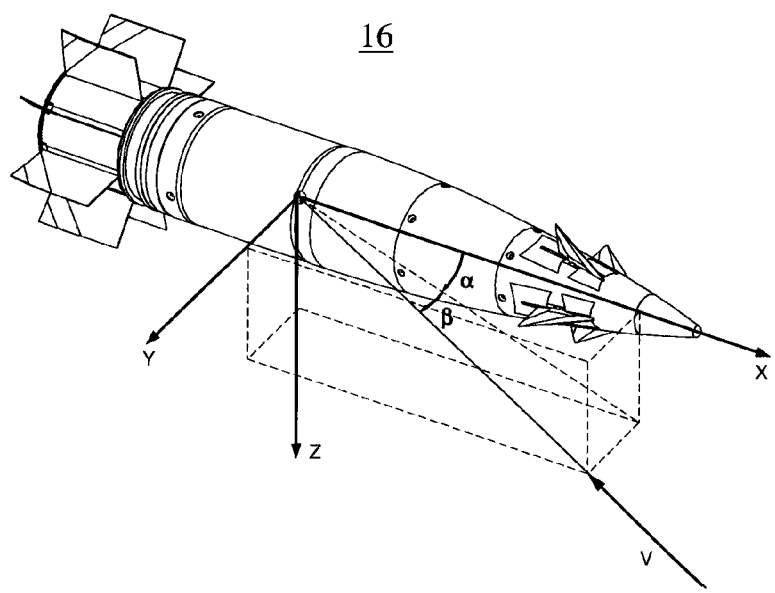

The invention will be described in greater detail below with reference to the appended figures, in which:

FIG. 1 shows a block diagram for a method for determining angle of incidence according to the invention, FIG. 2 shows a projectile with actuators, using the method for determining angle of incidence according to the invention.

DETAILED DESCRIPTION OF EMBODIMENTS

In FIG. 1 is shown a block diagram illustrating a method for determining and calculating angle of incidence 1, in which a regulator 2, on the basis of a desired reference signal 8, controls a motor 4. The reference signal 8 is constituted by the set point for the motor. The motor can also be termed a servo or actuator. The reference signal 8 is generated from the control system of the projectile. The motor 4 can be a linear motor, but is preferably a motor with rotating axle. The measured motor current 11 is compared with motor current 10 which is estimated on the basis of the signal and which emanates from the estimation of motor current 3 by the calculating block. The result of the difference between measured motor current 11 and estimated motor current 10 results in a current difference 12, which becomes input data to a model of the current/force function 6 of the motor. An output signal 13 from the current/force function of the motor is a signal which corresponds to the difference between the actual value of the motor current and the desired value of the motor current. In the Aerodata block 7, calculation is made on the basis of an output signal 13, which provides information on forces applied to the motor 4, with the reference signal 8, which provides information on expected applied forces. The output signal 13 and the reference signal 8, together with reference data, enable determination of the components α 14 and β 15 of the angle of incidence. The angle of incidence consists of α 14, which symbolizes the pitch component of the angle of incidence, and β 15, which symbolizes the yaw component of the angle of incidence. The yaw component β of the angle of incidence can also be termed the relative side wind angle. Determination of the components α 14 and β 15 of the angle of incidence is realized by calculation on the basis of a reference signal 8 and output signal 13, which are compared with data measured in a wind tunnel or calculated from simulation, which data have been stored in the Aerodata block 7. The information which has been created/measured in a wind tunnel or calculated can constitute a look-up table or be expressed in the form of a mathematical term, or otherwise represented in the Aerodata block 7.

In FIG. 2 is shown a figure illustrating a guidable projectile 16 constructed with a navigation system comprising angle of incidence determination according to the invention. In the figure are shown a, for the projectile, body-fixed coordinate system X, Y and Z, a velocity vector V, as well as the angles of incidence α and β, in which α symbolizes the pitch component of the angle of incidence and β symbolizes the yaw component of the angle of incidence. The pitch component for the angle of incidence is thus the change in the plane which is spanned by the X-axis and the Z-axis, and the yaw component for the angle of incidence is the change in the plane which is spanned by the X-axis and the Y-axis and in which the plane has been angled along the Y-axis by the angle α.

The angle of incidence is measured with or evaluated with the method, incorporated in the projectile, for calculating angle of incidence. By evaluating the angles of incidence, yaw angle and pitch angle are able to be determined. Roll angle can be determined by evaluation of the angle of incidence, together with a gyro for roll angular velocity. The various attitude angles, roll, yaw and pitch, together with current coordinates from a radio-based positioning system, give a complete navigation system. The radio-based positioning receiver, which can be a GPS receiver, a receiver for radar guidance, or other radio-based positioning equipment, is constructed to receive positioning information, and thus also to be able to calculate velocity information.

The GNC system mounted in the projectile, in which GNC stands for Guidance, Navigation and Control, measures current measurement values from sensors, calculates and predicts the path for reaching a target, and controls and regulates the controllers or actuators with which the projectile is equipped. The control system controls and regulates the forces which control the projectile, the forces are executed with, for example, actuators, motors or servos, which, in turn, move or otherwise act upon fins/control surfaces, canard fins, or other control members for controlling the projectile on the basis of the route towards the target which has been calculated by the guidance system. The control system also undertakes to keep the projectile stable during its path from launcher to target. The projectile is thus equipped with a control system, actuators and control members for controlling the projectile in the path of the projectile between launcher and target. Preferably, the actuator which moves the canard/fin is constituted by an electric motor. The force which moves the canard/fin is constituted by a torque acting from the motor. The torque created by the electric motor is proportional to the electric current fed to the motor. Through the creation of a mathematical model by the electric motor, for example by measurement in a test environment also referred to as a test bench, a dynamic model can be created for estimating the torque which is generated by a certain electric current. The dynamic motor model describes the behaviour of an actuator, comprising characteristics for, for example, motor and gear mechanism.

The dynamic change in the projectile, depending on how the control members of the projectile are changed, can be measured in a so-called wind tunnel. In case of measurement in the wind tunnel, the projectile is mounted in such a way that an actual firing state is imitated. By reading, with the sensors of the wind tunnel, the change in the projectile in response to a change in the control members, a descriptive record is created, in which the change in the projectile on the basis of the change in the control members is described. This descriptive record, also termed reference data, is used in estimating the angle of incidence when the moment measured or evaluated on the control member, on the basis of electric current which drives the actuator, is compared with the descriptive record. The process is carried out on the respective control member and at least two actuators and control members are required. The placement of the actuators and control members incorporated in the projectile must be such that both the pitch component of the angle of incidence and the yaw component of the angle of incidence can be calculated. Preferably four control members are used, with associated actuators, placed evenly distributed around the projectile body with 90-degree separation.

Apart from being measured in a wind tunnel, the dynamic change in the projectile, depending on how the control members of the projectile are changed, can also be calculated. For example, the calculation can comprise CFD calculations (Computational Fluid Dynamics) or other fluidic calculations.

An alternative embodiment is that the moment on the axle to the canard/fin is measured with a torque transmitter, in which the measurement result from the said torque transmitter is compared with the descriptive record measured in a wind tunnel in order to determine angle of incidence. The comparison between the measurement result from the torque transmitter and reference data may be required to be recalculated and converted in order for measurement data to correspond to reference data.

An example of a projectile with GNC system, applying a method for determining angle of incidence, is a roll-stabilized 155 mm artillery shell provided with four actuators and four control members in the form of control canards which are individually adjustable. In addition, the projectile is constructed with a GPS receiver and a roll gyro for determining roll angular velocity and thus roll angle.

Alternative Embodiments

The invention is not limited to the specifically shown embodiments, but can be varied in different ways within the scope of the patent claims.

It will be appreciated, for example, that the number, size, material and shape of the elements and component parts belonging to the method for determining angle of incidence and to the GNC system are adapted to the weapon system(s) and miscellaneous design characteristics which at present exist.

It will be appreciated that the above-described method for determining angle of incidence can be applied, in principle, to all vehicles and systems comprising vessels, aircraft, projectiles and missiles. In addition, the method for determining angle of incidence is applicable to, for example, wind power stations and hydro power plants for adaptation and/or determination of the pitch angle of the turbine or turbine blade.

The invention claimed is:

1. Method for determining angle of incidence for a projectile in the path of the projectile from launcher to target, which projectile is guidable and substantially or partially roll-stable and comprises a control system and at least two actuators with associated control members, which comprises the following steps:
measuring a moment upon the actuators of the projectile;
determination of applied force for pitch control based on the measured moment upon the actuators of the projectile,
determination of applied force for yaw control based on the measured moment upon the actuators of the projectile,
calculation of the pitch component α of the angle of incidence and of the yaw component β of the angle of incidence, based on comparison between the evaluated moments and reference data for moments.

2. Method for determining angle of incidence according to claim 1, wherein reference data for moments are obtained from a look-up table produced on the basis of measurement of aerodynamic characteristics of the projectile.

3. Method for determining angle of incidence according to claim 2, wherein comparison of the evaluated moment and reference data for moments is made by the reference data which are closest to the evaluated moment providing an evaluation of the pitch component α of the angle of incidence and of the yaw component β of the angle of incidence, on the basis of the look-up table of the said reference data.

4. Method for determining angle of incidence according to claim 2, wherein comparison of the evaluated moment and reference data for moments is made by the said reference data being a basis for the creation of a mathematical description of the said reference data, which mathematical description uses the said evaluated moments as variables in the mathematical description in such a way that the pitch component α of the angle of incidence and the yaw component β of the angle of incidence are calculated.

5. Method for determining angle of incidence according claim 2, wherein the evaluated moment is determined on the basis of measurement of electric current to the drive unit of the actuators.

6. Method for determining angle of incidence according to claim 1, wherein reference data for moments are obtained from a look-up table produced from calculation of aerodynamic characteristics of the projectile.

7. Method for determining angle of incidence according to claim 6, wherein comparison of the evaluated moment and reference data for moments is made by the reference data which are closest to the evaluated moment providing an evaluation of the pitch component α of the angle of incidence and of the yaw component β of the angle of incidence, on the basis of the look-up table of the said reference data.

8. Method for determining angle of incidence according to claim 6, wherein comparison of the evaluated moment and reference data for moments is made by the said reference data being a basis for the creation of a mathematical description of the said reference data, which mathematical description uses the said evaluated moments as variables in the mathematical description in such a way that the pitch component α of the angle of incidence and the yaw component β of the angle of incidence are calculated.

9. Method for determining angle of incidence according to claim 1, wherein comparison of the evaluated moment and reference data for moments is made by the reference data which are closest to the evaluated moment providing an evaluation of the pitch component α of the angle of incidence and of the yaw component β of the angle of incidence, on the basis of the look-up table of the said reference data.

10. Method for determining angle of incidence according to claim 9, wherein comparison of the evaluated moment and reference data for moments is made by the said reference data being a basis for the creation of a mathematical description of the said reference data, which mathematical description uses the said evaluated moments as variables in the mathematical description in such a way that the pitch component α of the angle of incidence and the yaw component β of the angle of incidence are calculated.

11. Method for determining angle of incidence according to claim 1, wherein comparison of the evaluated moment and reference data for moments is made by the said reference data being a basis for the creation of a mathematical description of the said reference data, which mathematical description uses the said evaluated moments as variables in the mathematical description in such a way that the pitch component α of the angle of incidence and the yaw component β of the angle of incidence are calculated.

12. Method for determining angle of incidence according to claim 1, wherein the evaluated moment is determined on the basis of measurement of electric current to the drive unit of the actuators.

13. Method for determining angle of incidence according to claim 1, wherein the evaluated moment is determined by measurement of torques acting on the actuators with a torque transmitter.

14. GNC system for a guidable projectile, which projectile is guidable and substantially or partially roll-stable and comprises a control system and at least two actuators with associated control members, comprising:
   means for measuring a moment upon the actuators of the projectile;
   means for determining an applied force for pitch control based on the measured moment upon the actuators of the projectile,
   means for determining an applied force for yaw control by evaluation of the measured moment upon the actuators of the projectile,
   means for calculating a pitch component α of the angle of incidence and of the yaw component β of the angle of incidence, based on comparison between the evaluated moments and reference data for moments.

15. GNC system for a guidable projectile according to claim 14, wherein reference data for moments are obtained from a look-up table produced on the basis of measurement of aerodynamic characteristics of the projectile.

16. GNC system for a guidable projectile according to claim 14, wherein reference data for moments are obtained from a look-up table produced from calculation of aerodynamic characteristics of the projectile.

17. GNC system for a guidable projectile according to claim 14, wherein comparison of the evaluated moment and reference data for moments is made by the reference data which are closest to the evaluated moment providing an evaluation of the pitch component α of the angle of incidence and of the yaw component β of the angle of incidence, on the basis of the look-up table of the said reference data.

18. GNC system for a guidable projectile according to claim 14, wherein comparison of the evaluated moment and reference data for moments is made by the said reference data being a basis for the creation of a mathematical description of the said reference data, which mathematical description uses the said evaluated moments as variables in the mathematical description in such a way that the pitch component α of the angle of incidence and the yaw component β of the angle of incidence are calculated.

19. GNC system for a guidable projectile according to claim 14, wherein the evaluated moment is determined on the basis of measurement of electric current to the drive unit of the actuators.

20. GNC system for a guidable projectile according to claim 14, wherein the evaluated moment is determined by measurement of torques acting on the actuators with a torque transmitter.

* * * * *